United States Patent
Terrat et al.

(10) Patent No.: US 11,565,577 B2
(45) Date of Patent: Jan. 31, 2023

(54) POWERTRAIN MODULE

(71) Applicant: VOLVO TRUCK CORPORATION, Gothenburg (SE)

(72) Inventors: Jean Terrat, Malleval (FR); Thomas Barillot, Mornant (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 89 days.

(21) Appl. No.: 17/262,968

(22) PCT Filed: Jul. 24, 2018

(86) PCT No.: PCT/EP2018/070009
§ 371 (c)(1),
(2) Date: Jan. 25, 2021

(87) PCT Pub. No.: WO2020/020440
PCT Pub. Date: Jan. 30, 2020

(65) Prior Publication Data
US 2021/0268885 A1  Sep. 2, 2021

(51) Int. Cl.
*B60K 1/02* (2006.01)
*F16H 3/72* (2006.01)
*F16H 57/033* (2012.01)
*F16H 57/02* (2012.01)

(52) U.S. Cl.
CPC .............. *B60K 1/02* (2013.01); *F16H 3/728* (2013.01); *F16H 57/033* (2013.01); *F16H 2057/02034* (2013.01)

(58) Field of Classification Search
CPC  F16H 57/033; F16H 2057/02034; B60K 1/02
See application file for complete search history.

(56) References Cited

U.S. PATENT DOCUMENTS

| | | | |
|---|---|---|---|
| 5,558,589 | A | 9/1996 | Schmidt |
| 6,820,707 | B1 | 11/2004 | Cantemir |
| 2005/0023053 | A1 | 2/2005 | Bennett |
| 2012/0258831 | A1 | 10/2012 | Knoblauch et al. |
| 2017/0313181 | A1* | 11/2017 | Isono ..................... B60K 17/02 |

OTHER PUBLICATIONS

International Search Report and Written Opinion dated Mar. 26, 2019 in corresponding International PCT Application No. PCT/EP2018/070009, 8 pages.

* cited by examiner

*Primary Examiner* — Erin D Bishop
(74) *Attorney, Agent, or Firm* — Venable LLP; Jeffri A. Kaminski (57) ABSTRACT

The invention relates to a powertrain module (10) comprising: —a powertrain system for driving at least one wheel of a vehicle, the powertrain system comprising: —a motor (5) having an output shaft; —and a transmission system between the motor (5) and a drive shaft (4) connected to said wheel; —and a casing (11) which houses the transmission system. The powertrain module (10) comprises connecting means (15) for cooperating with the connecting means (15) of an identical powertrain module (10) arranged in a facing relationship with said powertrain module (10), for mechanically connecting said two powertrain modules (10).

19 Claims, 6 Drawing Sheets

POWERTRAIN MODULE

CROSS-REFERENCE TO RELATED APPLICATIONS

This application is a U.S. National Stage application of PCT/EP2018/070009, filed Jul. 24, 2018, and published on Jan. 30, 2020, as WO 2020/020440 A1, all of which is hereby incorporated by reference in its entirety.

TECHNICAL FIELD

The invention relates to a powertrain module comprising a powertrain system for driving at least one wheel of a vehicle. The invention also relates to a driven wheel system for a vehicle comprising at least one such powertrain module, and to a vehicle comprising at least one such driven wheel system.

BACKGROUND

Transport industry is moving to electric-powered vehicles to deal with emission regulation requirements which are becoming more and more demanding. Electric vehicles require significant space for batteries, which means that other vehicle components need to be fairly compact. Indeed, the transverse width of a vehicle, in particular a truck, is limited to a maximum value given by regulatory requirements. This applies in particular to the powertrain system, especially on a driven wheel system which includes a device providing a differential effect, in order to allow the outer drive wheel to rotate faster than the inner drive wheel during a turn.

Such a space constraint is even more significant in some vehicle configurations:
- for vehicles having an independent wheel suspension configuration, as they require an increased length in the transverse direction of the vehicle, to get enough space for the drive shafts to work with acceptable angles, specifically if the vehicle is designed without wheel reduction;
- for vehicles not comprising a mechanical differential, but implementing a torque vectoring solution. This creates packaging issues since the left and right wheels need to be independently driven, duplicating the transmission from the motor to the wheel(s).

Another issue in electric drivelines is the significant diversity in terms of powers, uses and applications. Therefore, powertrain systems are required to fit various needs, without impairing compactness nor efficiency, and while also ensuring the required mechanical strength.

SUMMARY

An object of the invention is to provide an improved powertrain system, which can solve at least one of the above-mentioned problems of the prior art.

In particular, an object of the invention is to provide a powertrain module—including a powertrain system in a casing—which is more compact in the vehicle transverse direction, while preferably offering advantageous functionalities.

To that end, and according to a first aspect, the invention concerns a powertrain module comprising:
 a powertrain system for driving at least one wheel of a vehicle, the powertrain system comprising:
  a motor having an output shaft;
  and a transmission system between the motor and a drive shaft connected to said wheel;
 and a casing which houses the transmission system;
wherein the powertrain module comprises connecting means for cooperating with the connecting means of an identical powertrain module arranged in a facing relationship with said powertrain module, for mechanically connecting said two powertrain modules.

It is specified that "motor" means "electric motor".

The arrangement according to the invention allows significantly increasing compactness, and therefore frees up some space, especially to receive the necessary components of torque vectoring solutions. Torque vectoring technology consists in providing one powertrain system for each left or right wheel, to achieve the differential effect Each powertrain system is configured to vary the torque to the corresponding wheel, depending on the driving conditions (straight road or curve, ground surface slipping properties, etc.).

Moreover, because of the compactness of the powertrain module, it can be implemented on a vehicle having an independent wheel suspension arrangement, with dual mounted tires and without wheel reduction. This is all the more significant as independent wheel suspension is a key solution to develop an optimized electrified driveline.

Another advantage of the invention is that it further improves stress transmission between the powertrain modules, therefore improving the overall mechanical strength.

Furthermore, having one independent powertrain module including its own casing which can be assembled to another casing allows more modularity and/or scalability as compared to a casing made as a single body for housing a powertrain module for the left wheel(s) and a powertrain module for the right wheel(s).

The connecting means can be provided on the casing of the powertrain module and be configured for mechanically connecting the casing of said powertrain module and the casing of an identical powertrain module arranged in a facing relationship with said powertrain module.

In an implementation, the transmission system has a first axis associated with the motor output shaft and a second axis configured to be associated to the drive shaft. The first and second axes can be parallel. Furthermore, the connecting means are configured to cooperate with the connecting means of an identical powertrain module, such that said powertrain modules are arranged with their second axes substantially coincident, and such that the casings are rotationally offset the one relative to the other around said second axes.

The first axis can be coincident with the axis of the motor output shaft; and the second axis can be coincident with the axis of the drive shaft. More generally "associated" means that a component of the transmission system having an axis identical to the first axis is connected to the motor output shaft; and that a component of the transmission system having an axis identical to the second axis is connected to the drive shaft, in use.

The connecting means can be configured for engaging the connecting means of an identical powertrain module. Then, the cooperation between the connecting means is achieved by mutual engagement of said connecting means.

Alternatively, the connecting means could include holes provided on the casing of the powertrain module, that can be placed coincident with the holes of another powertrain module casing. The holes of the two powertrain modules then cooperate, and a fastener such as a nut can be inserted in the holes to secure the two powertrain modules.

The connecting means can comprise a dog clutch connection. For example, indentations can be arranged in a circle around the second axis.

The casing may comprise at least one receiving area for a gear system, such as an epicyclic gear train, configured to be connected to the output shaft of an additional motor, the gear system having an axis parallel to the first and second axes and meshing with a part of the transmission system. This part of the transmission system can be an epicyclic gear train.

Owing to this arrangement, the invention provides a modular and/or scalable powertrain module which can include one, two or three motors depending on the needs in terms of power, or application.

Preferably, the transmission system can comprise:
a first epicyclic gear train which is connected to the motor output shaft, in use, and which has an axis coincident with the first axis;
and a second epicyclic gear train which is connected to the drive shaft, in use, and which has an axis coincident with the second axis.

Then, the gear system can have an additional epicyclic gear train, which can be identical to first epicyclic gear train.

Besides, to improve spatial layout, the two motors may be mounted on the same side of the casing along the axes.

The powertrain module may thus further comprise at least one additional motor and at least one gear system, such as an epicyclic gear train, connected to or connectable to the additional motor, the gear system being mounted or configured to be mounted in the or one of the receiving area(s) of the casing. With this arrangement, the invention can provide on the one hand a basic powertrain module with only one motor, and on the other hand an upgrade kit including an additional motor and its dedicated gear system, for being connected to the basic powertrain module.

The plane including the first axis and the second axis and the plane including the second axis and the axis of the gear system can form an angle comprised between 80° and 180°, preferably between 100° and 160°. In other words, the casing can substantially have the shape of a V, when seen along the direction of the axes. In case the angle is 180°, the above mentioned planes are coincident and thus form one and a single plane.

This makes it possible to mount on the vehicle chassis two modules each including two motors—or one motor and one motor receiving area—located at one end of the V-shaped casing, while arranging one motor or a first powertrain module between the two motors of the second powertrain module. This results in space gain and reduces the impact on ground clearance.

According to an embodiment, the transmission system comprises two epicyclic gear trains each including the following components: a ring, a sun, a planet carrier and planet gears, wherein:
a first epicyclic gear train has a first axis, a component forming a first input component connected to the motor output shaft, and a component forming a first output component;
a second epicyclic gear train has a second axis parallel to the first axis, a component forming a second input component meshing with the first output component, and a component forming a second output component configured to be connected to the drive shaft.

The powertrain system thus includes two epicyclic gear trains which are structurally arranged in parallel and functionally arranged in series. Such a powertrain system is highly advantageous, as it provides a high gear ratio as well as a significant compactness in the transverse direction of the vehicle, therefore leaving space for other components, especially batteries.

According to an implementation, the ring, an intermediate part slidably mounted on the outer part of the ring, or the sun of one of the epicyclic gear trains is movable, preferably parallel to the first and second axes, between at least:
a first position, in which the motor is able to transmit torque to the drive shaft according to a first gear ratio;
and a second position, in which the motor is able to transmit torque to the drive shaft according to a second gear ratio.

Such a gear ratio change makes it possible to better fit the various customer needs with one and the same powertrain module, and can further improve efficiency.

More specifically, a slow gear ratio is needed to ensure startability performances (i.e. torque demand at start). Having a fixed gear ratio would mean that in cruising conditions, the motor runs at high speed/low torque conditions, which are poor efficiency conditions for an electric motor. By providing at least a second gear ratio, the invention ensures improved efficiency in many conditions, including starting and cruising. Owing to the use of the epicyclic gear trains, providing a second gear ratio—which involves a corresponding gear changing device—does not significantly impair the compactness of the powertrain system.

It may be envisaged that the ring, an intermediate part slidably mounted on the outer part of the ring, or the sun of one of the epicyclic gear trains be movable, preferably parallel to the first and second axes, between:
at least one position in which the motor is able to transmit torque to the drive shaft;
and a neutral position in which no torque can be transmitted from the motor to the drive shaft.

In such a neutral position, the motor can transmit torque to one component of the second epicyclic gear train, but not to the drive shaft.

This arrangement may be useful with a powertrain module including two motors (or more), as previously described. This has a specific interest during a battery charging phase.

More precisely, the invention provides a method for charging a battery set of a vehicle with such a powertrain module, the method comprising:
connecting the motor to a power supply located outside the vehicle;
connecting the additional motor to the battery set;
bringing the ring or the sun of the second epicyclic gear train in the neutral position, as previously described, so that the motor is able to transmit torque to the additional motor through the epicyclic gear trains and no torque can be transmitted from the motor to the drive shaft.

Then, the motor acts as an electrical/mechanical converter and the additional motor acts as a mechanical/electrical converter, the mechanical energy being transmitted through the epicyclic gear trains, which makes it possible to charge the battery set. In other words, the motor acts as a motor, and the other motor acts as an alternator.

The gap between the rotor and the stator of the motor provides a galvanic isolation, which is required during a charging phase for safety reasons. Owing to the invention, the power supply—typically provided by an electric network outside the vehicle—is electrically isolated from the batteries of the vehicle without electronic devices. This provides a high advantage over conventional solutions which use electronic devices and therefore have a significant cost.

Furthermore, using the neutral position allows conducting the charging process without rotating the wheels. Indeed, the invention makes it possible to declutch the second epicyclic gear train during the battery charging process, while keeping the vehicle standstill, as the wheels are not driven by the motors.

This arrangement providing a neutral position may also be useful to tow a disabled vehicle, in particular a truck, without running the motors.

The piece that is moveable between at least a first position and a second position, and/or between at least one position and a neutral position can be the ring of the second epicyclic gear train, or an intermediate part slidably mounted on the outer part of said ring. Such an implementation is advantageous in terms of compactness and output rotation speed. It is furthermore required in case the powertrain system comprises two motors each provided with a dedicated epicyclic gear train and sharing the second epicyclic gear train.

As regards the intermediate part slidably mounted on the outer part of said ring, it can be provided with splines engaging the outer teeth of the ring, for allowing relative axial movement but preventing relative rotational movement.

In an embodiment, the ring of one of the epicyclic gear trains can form the first output component or respectively the second input component. Furthermore, said ring can have inner teeth for meshing with the planet gears of the same epicyclic gear train and outer teeth for meshing with the second input component or respectively the first output component. This makes it possible to have an even more compact powertrain system in the vehicle transverse direction. The inner teeth and outer teeth may preferably be located in one and the same plane orthogonal to the first and second axes.

The ring of the first epicyclic gear train can form the first output component. Furthermore, said ring can have inner teeth for meshing with the planet gears of the first epicyclic gear train and outer for meshing with the second input component. This implementation provides a particularly satisfactory gear ratio.

According to one embodiment, the first input component is the sun and the first output component is the ring. The planet carrier of the first epicyclic gear train may be fastened—or integrated—to the casing which houses the transmission system. Preferably, the first epicyclic gear train may be of "Type I", i.e. with the sun as an inner component, the ring as an outer component, with the planet gears arranged in between.

According to one embodiment, the second input component is the sun and the second output component is the planet carrier, planet gears being rotationally mounted on the planet carrier and being arranged between the sun and the ring. Preferably, the second epicyclic gear train may be of "Type I", i.e. with the sun as an inner component, the ring as an outer component, with the planet gears arranged in between.

In an embodiment, in the first epicyclic gear train, the sun can be configured as an inner component, the ring can be configured as an outer component, with the planet gears arranged in between and rotationally mounted on the planet carrier, the planet carrier being fastened to the casing of the powertrain module (for example made as a single piece with said casing). Furthermore, said ring of the first epicyclic gear train can have inner teeth for meshing with the planet gears of the first epicyclic gear train and outer teeth for meshing with the sun of the second epicyclic gear train or a hub secured to said sun, the inner teeth and outer teeth preferably being located in one and the same plane orthogonal to the first and second axes.

With a specific configuration, in which the ring bears both inner and outer teeth located in a same plane, compactness is greatly increased.

The ring of the second epicyclic gear train—or an intermediate part slidably mounted on the outer part of the ring (202)—can be movable relative to the casing, parallel to the first and second axes, between:
  the first position, in which said ring is rotationally fastened to the sun of the second epicyclic gear train or to a hub secured to said sun;
  and the second position, in which said ring is rotationally fastened to the casing.

The second position results in a higher gear reduction ratio than the first position. For example, the ratio in the first position can be 1, while the ratio in the second position can be 3.4.

The ring of the second epicyclic gear train—or an intermediate part slidably mounted on the outer part of the ring (202)—can be movable relative to the casing, parallel to the first and second axes, between:
  at least one of: a first position, in which said ring is rotationally fastened to the sun of the second epicyclic gear train or to a hub secured to said sun; and a second position, in which said ring is rotationally fastened to the casing;
  and a neutral position in which said ring is rotationally uncoupled from both the sun of the second epicyclic gear train and the casing.

According to a second aspect, the invention relates to a driven wheel system for a vehicle, comprising at least one left wheel and one right wheel, each wheel being connected to a drive shaft, the driven wheel system further comprising at least one powertrain module as previously described.

In a torque vectoring mode, one powertrain module is provided for each wheel. Each module may include one or two motors (or even three), or one motor and at least one receiving area for an additional motor. The two modules are preferably arranged in a facing and interlinked relationship, with their casings mechanically connected to one another, as previously explained.

According to an embodiment, commonly referred to as "rigid axle configuration", the driven wheel system forms an axle and comprises:
  a first axle housing secured to one side of the casing of one powertrain module, preferably opposite the motor, and receiving a first drive shaft connected between a first wheel of the driven wheel system and the powertrain system of said powertrain module;
  a second axle housing receiving a second drive shaft, said second drive shaft being connected between a second wheel of the driven wheel system and the powertrain system of another powertrain module. The second axle housing is secured to the casing of said other powertrain module,
wherein said two powertrain modules are arranged in a facing relationship and are connected via their respective connecting means.

It has to be noted that the term "secured" does not necessarily means "directly secured"; an intermediate part can be provided to achieve this.

According to another embodiment, commonly referred to as "independent wheel suspension", the connection between one wheel and one powertrain module is made by means of a connection device including a driveshaft, at least one joint (such as a universal joint, an homocinetic joint, etc.), at least one lower arm articulated at both ends and preferably at least one upper arm articulated at both ends. Furthermore, the driven wheel system comprises two powertrain modules. A first wheel is connected to a first powertrain module by means of a first connection device, and a second wheel is connected to a second powertrain module by means of a second connection device. Said two powertrain modules are arranged in a facing relationship and are connected via their respective connecting means.

According to a third aspect, the invention relates to a vehicle comprising at least one driven wheel system as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figures 1, 2, 3A, 3B:
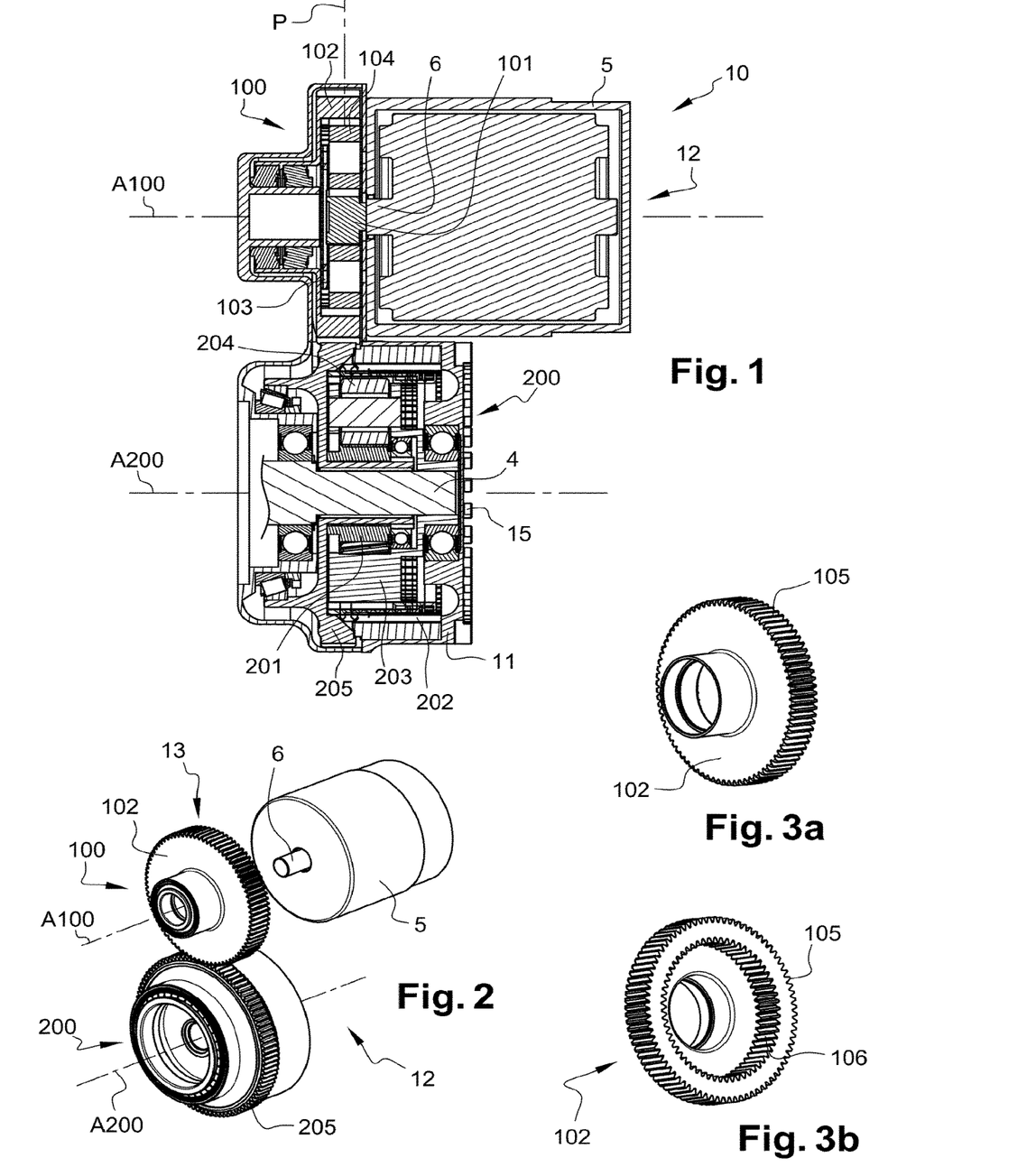
FIG. 1 is a sectional view of a powertrain module according to an embodiment of the invention, comprising one motor and a transmission system including a first and a second epicyclic gear trains.
FIG. 2 is an exploded perspective view of the powertrain module of FIG. 1.
FIGS. 3a and 3b are perspective views of a ring pertaining to the first epicyclic gear train.
Figure 4:
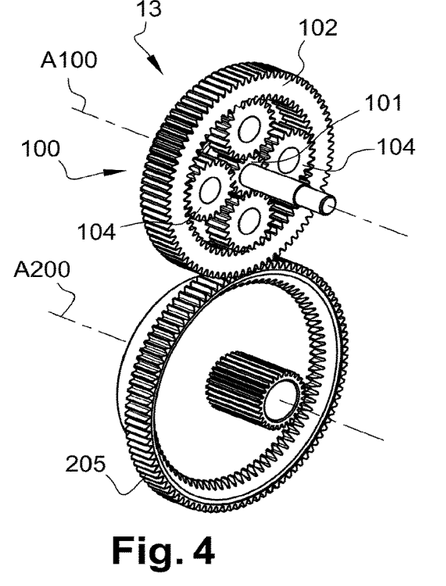
FIG. 4 is a perspective partial view of the transmission system of FIG. 1.

FIGS. 1 and 2 show a powertrain module 10 according to an embodiment of the invention.

Figure 11:
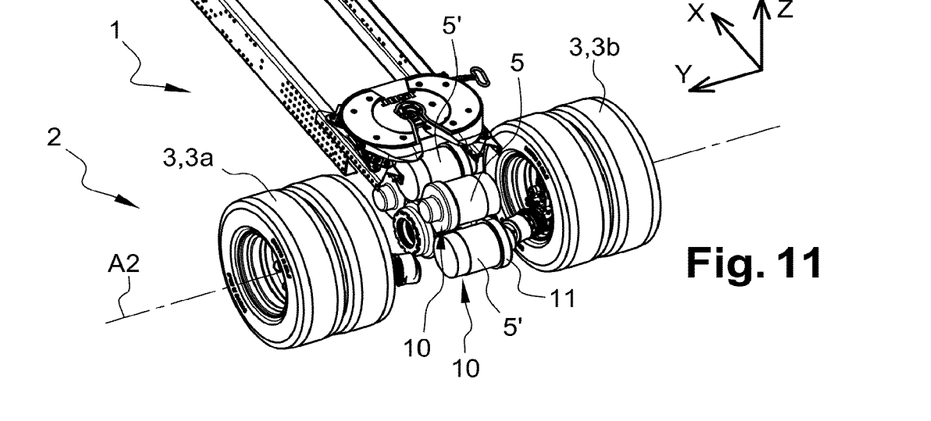
FIG. 11 shows an implementation of two powertrain modules of FIG. 10 on a vehicle driven wheel system.
Figure 13:
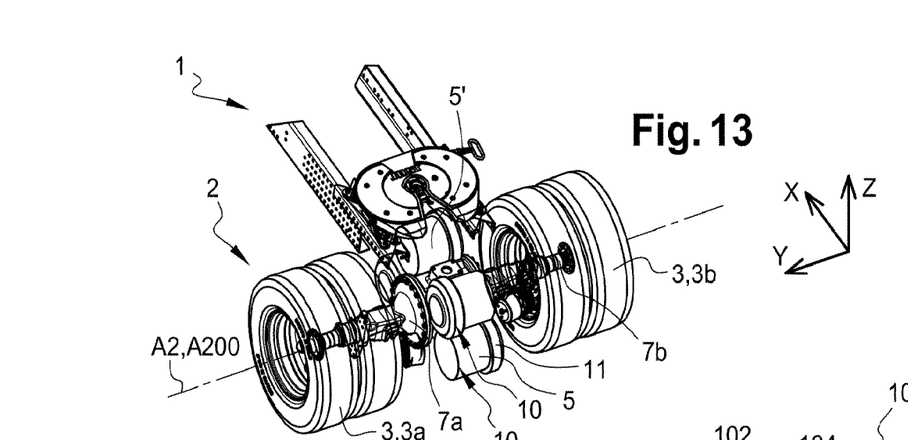
FIG. 13 shows another implementation of two powertrain modules of FIG. 10 on a vehicle driven wheel system.

The powertrain module 10 is designed to be implemented in a vehicle 1. As shown in FIGS. 11 and 13, the vehicle 1 comprises at least one driven wheel system 2 which has an axis A2 and which comprises at least one left wheel 3, 3a and one right wheel 3, 3b. Each wheel 3 is connected to a drive shaft 4, 4a, 4b. The driven wheel system 2 further comprises at least one powertrain module 10 arranged between the drive shafts 4. It has to be noted that the drive shafts 4 are not illustrated in FIG. 11, and are not visible in FIG. 13.

The vehicle 1 may comprise a front axle connected to front wheels (not shown), and at least one driven rear wheel system 2—for example a first driven rear wheel system and a second driven rear wheel system located rearwards from the first driven rear wheel system. Each rear wheel system 2 can comprise two wheels 3 on either side, thus forming a dual mounted tires arrangement.

The invention can be applied in heavy-duty vehicles, such as trucks, buses and construction equipment, as well as medium-duty vehicles. Although the following description is made with reference to a rear wheel system, it has to be noted that the invention can be used on another driven wheel system, for example on a driven front wheel system.

As shown in FIGS. 11 and 13, direction X is defined as the longitudinal direction of the vehicle 1 and direction Y is defined as the transverse direction of the vehicle 1, i.e. the direction of axis A2 of the driven wheel system 2. Directions X and Y are substantially horizontal when the vehicle 1 is on a horizontal surface. Moreover, direction Z is defined as the vertical direction—when the vehicle 1 is on a horizontal surface.

The invention will be described when the vehicle 1 is on a horizontal surface.

The powertrain module 10 essentially comprises a casing 11 and a powertrain system 12. The powertrain system 12 is configured to drive at least one wheel 3 and comprises:
- a motor 5 having an output shaft 6;
- a transmission system 13 between the motor 5 and the drive shaft 4 connected to said wheel 3, the transmission system 13 being housed in the casing 11.

According to a non-limiting embodiment, as illustrated in FIGS. 1 to 4, the transmission system 13 may comprise a first epicyclic gear train 100 having a first axis A100, and a second epicyclic gear train 200 having a second axis A200 which is parallel to the first axis A100.

In the operating position, i.e. when the powertrain module 10 is mounted on the vehicle 1, as shown in FIGS. 11 and 13, the axes A100 and A200 are parallel to direction Y.

The first epicyclic gear train 100 may comprise:
- a sun 101 which is connected to the motor output shaft 6 and forms a first input component of the transmission system 13. The sun 101 is arranged as an inner component of the first epicyclic gear train 100, as better seen in FIG. 4;
- a ring 102 which is arranged as an outer component of the first epicyclic gear train 100, as better seen in FIG. 4, and which forms a first output component of the transmission system 13;
- a planet carrier 103 which is fixedly secured to the casing 11, or could be made as a single piece with the casing 11;
- planet gears 104 (for example four planet gears) arranged between the sun 101 and the ring 102. The planet gears 104 are rotationally mounted on the planet carrier 103.

The second epicyclic gear train 200 may comprise:
- a sun 201 which is fixedly secured to a hub 205, said hub 205 meshing with the ring 102 of first epicyclic gear train 100. The sun 201 is arranged as an inner component of the second epicyclic gear train 200 and forms a second input component of the transmission system 13;
- a ring 202 which is arranged as an outer component of the second epicyclic gear train 200;

a planet carrier 203 which forms a second output component of the transmission system 13;

planet gears 204 (for example four planet gears) arranged between the sun 201 and the ring 202. The planet gears 204 are rotationally mounted on the planet carrier 203.

As better shown in FIGS. 3a and 3, the ring 102 of the first epicyclic gear train 100 can have outer teeth 105 for meshing with the hub 205 of the second epicyclic gear train 200, i.e. for driving the sun 201 around the second axis A200. The ring 102 can further have inner teeth 106 for meshing with the planet gears 104 of the first epicyclic gear train 100.

Such an arrangement is advantageous as it results in a layout which is even more compact in the transverse direction Y. This is even more significant if the ring 102 is configured so that the inner teeth 106 and outer teeth 105 are located in one and the same plane P orthogonal to the first and second axes A100, A200, as shown in FIG. 1. Another advantage of such a double-teeth configuration is that only one piece is necessary, which decreases the time needed for assembling the transmission system. However, this specific configuration of the ring 102 shall not be considered as limitative.

The transmission system 13 therefore makes it possible to transmit torque from the motor 5 to the wheels 3, and to multiply said torque according to at least one gear ratio.

It may be desirable to improve efficiency to provide two different gear ratios. Indeed, slow gear ratio allows good slope startability, while fast gear ratio allows good efficiency in cruising conditions.

Figure 5A:
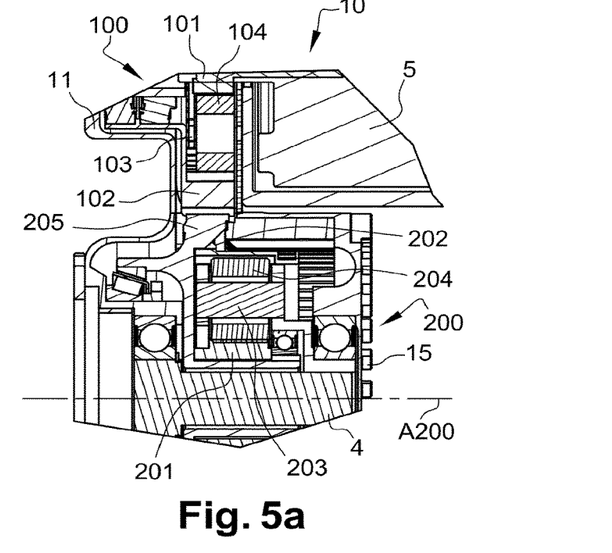
FIGS. 5a, 5b and 5c are sectional views showing various positions of a ring of the second epicyclic gear train.
Figure 5B:
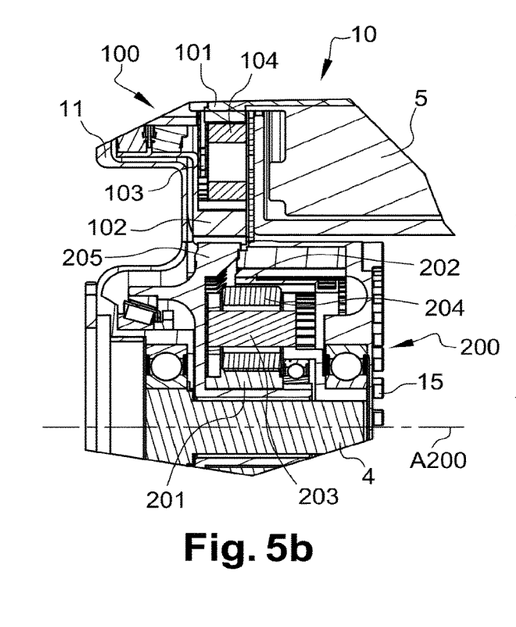

To that end, the ring 202 of the second epicyclic gear train 200 can be movable relative to the casing 11, parallel to the first and second axes A100, A200, between at least:

a first position, in which said ring 202 is rotationally fastened to the sun 201 of the second epicyclic gear train 200 or to the hub 205. In this first position, depicted in FIG. 5a, the motor 5 is able to transmit torque to the drive shaft 4 according to a first gear ratio which here is a fast gear ratio;

and a second position, in which said ring 202 is rotationally fastened to the casing 11. In this second position, depicted in FIG. 5b, the motor 5 is able to transmit torque to the drive shaft 4 according to a second gear ratio which here is a slow gear ratio.

Therefore, the powertrain module 10 of the invention can adapt to the driving phase or condition.

Figure 5C:
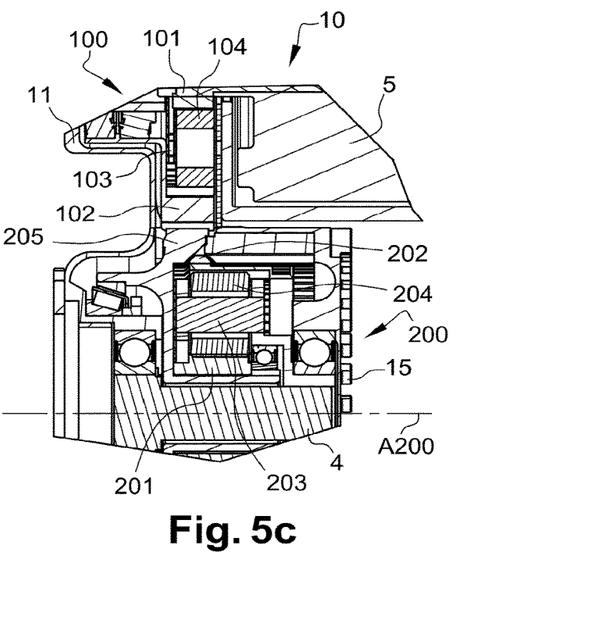

In addition to the first and/or second position, the ring 202 of the second epicyclic gear train 200 can be placed in a neutral position, in which said ring 202 is rotationally uncoupled from both said sun 201 and the casing 11. In this neutral position, illustrated in FIG. 5c, no torque can be transmitted from the motor 5 to the drive shaft 4. In other words, along the transverse direction Y, the ring 202 is located between the part of the sun 201 of the second epicyclic gear train 200 and the part of the casing 11 which are configured to engage with the ring 202.

Alternatively, the ring 202 can remain at the same axial position, and there may be provided an intermediate part slidably mounted on the outer part of the ring 202, which can be placed in the first position, second position or neutral position.

Figures 6, 7, 8:
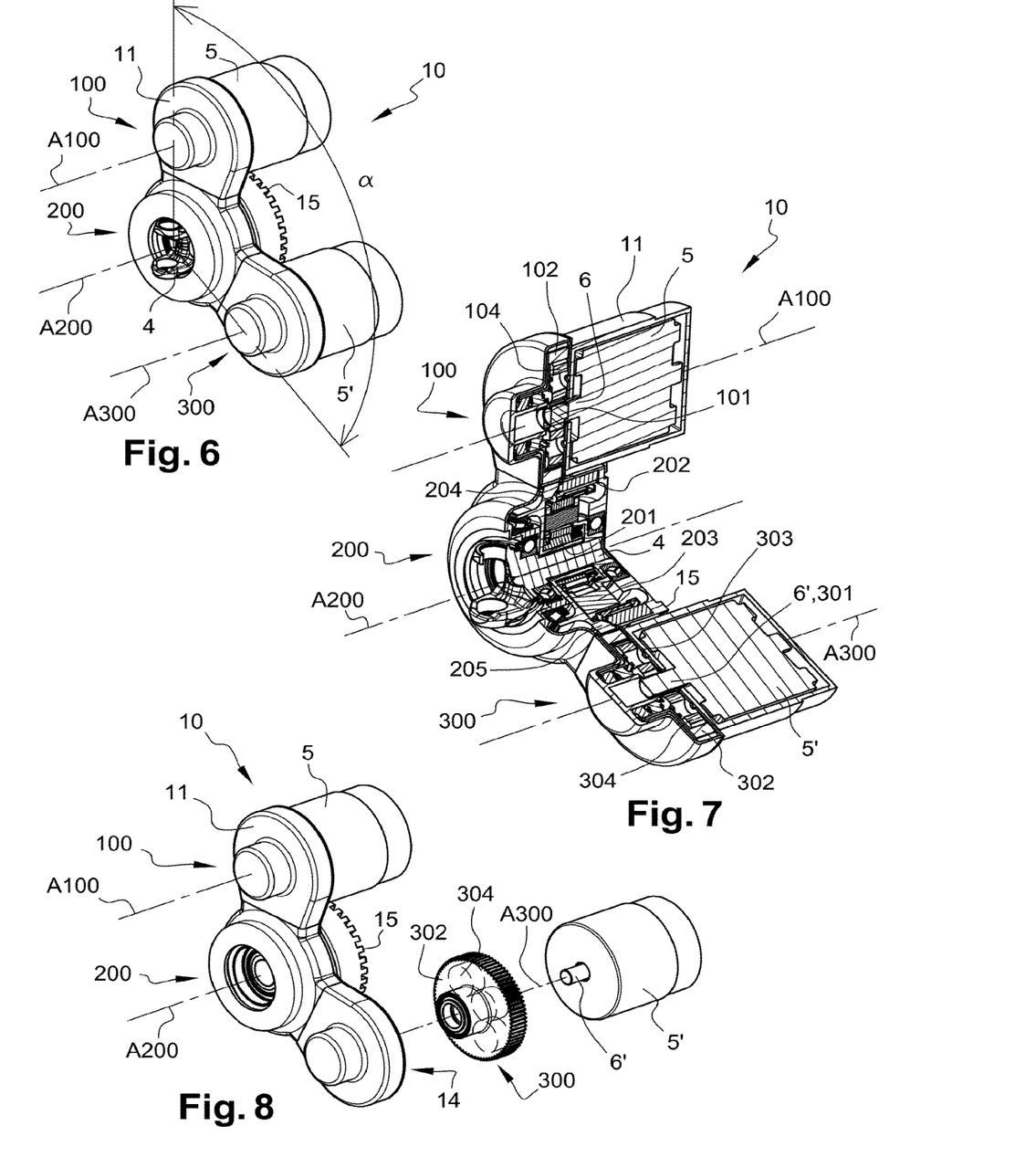
FIG. 6 is a perspective view of a powertrain module according to another embodiment of the invention, comprising an additional motor.
FIG. 7 is a sectional view of the powertrain module of FIG. 6.
FIG. 8 is a partially exploded perspective view of the powertrain module of FIG. 6.

Reference is now made to FIGS. 6 to 8.

It may be desirable that the powertrain module 10 comprises or is designed to receive at least one additional motor 5'. Providing a powertrain module 10 which can include more than one motor makes it possible to better meet the performance demands, in terms of power, startability, gross combined weight rating (GCW), etc. The motors 5, 5' may be identical. Preferably, the motors 5, 5' are mounted on a same side of the casing 11, along the transverse direction Y.

As shown on FIG. 8, the casing 11 may comprise at least one receiving area 14 for an additional epicyclic gear train 300 configured to be connected to the output shaft 6' of an additional motor 5'. The additional epicyclic gear train 300, when mounted on the receiving area 14 of the casing 11, has an axis A300 which is parallel to the first and second axes A100, A200, and meshes with the second epicyclic gear train 200.

In practice, the additional epicyclic gear train 300 may be identical to the first epicyclic gear train 100. Then, as shown in FIGS. 7 and 8, the additional epicyclic gear train 300 can comprise:

a sun 301 connected to the motor output shaft 6';

a ring 302 which meshes with the hub 205 fixedly secured to the sun 201 of the second epicyclic gear train 200 a planet carrier 303 which is fixedly secured to the casing 11 or could be made as a single piece with the casing 11;

planet gears 304 (for example four planet gears) arranged between the sun 301 and the ring 302 and rotationally mounted on the planet carrier 303.

In FIG. 6, the additional epicyclic gear train 300 (which is not visible) is mounted in the receiving area 14 of the casing 11 and meshes with the second epicyclic gear train 200. It is further connected to the output shaft 6' of the additional motor 5'. Thus, the powertrain module 10 comprises two motors. Powertrain modules with more than two motors, for example with three motors, can be envisaged.

According to a variant, as shown in FIG. 8, there may be provided:

on the one hand, a powertrain module 10 with a single motor 5, but with a casing 11 comprising a receiving area 14 for an additional motor, if need be;

and, on the other hand, an additional motor 5' and an additional epicyclic gear train 300 which is configured to be mounted in the receiving area 14 of the casing 11 and to be connected to the additional motor 5'.

As a result, it is possible to equip a vehicle 1 with a powertrain module 10 including a single motor 5 and to upgrade this powertrain module 10 by implementing an additional motor 5' if needed.

The invention is of particular interest to implement a torque vectoring solution. Then, one powertrain module 10 is provided to drive each wheel 3 of the driven wheel system 2 (or each set of wheels of the driven wheel system 2, on one given side of the vehicle 1). Thus, the differential effect, i.e. the fact that the outer drive wheel rotates faster than the inner drive wheel during a turn, is achieved by the fact that the wheels are driven independently by the dedicated powertrain module 10.

In a torque vectoring solution, as two powertrain modules 10 are provided on the driven wheel system 2, the space required is larger. Consequently, there is a need to make the set of two powertrain modules 10 as compact as possible.

Figure 9:
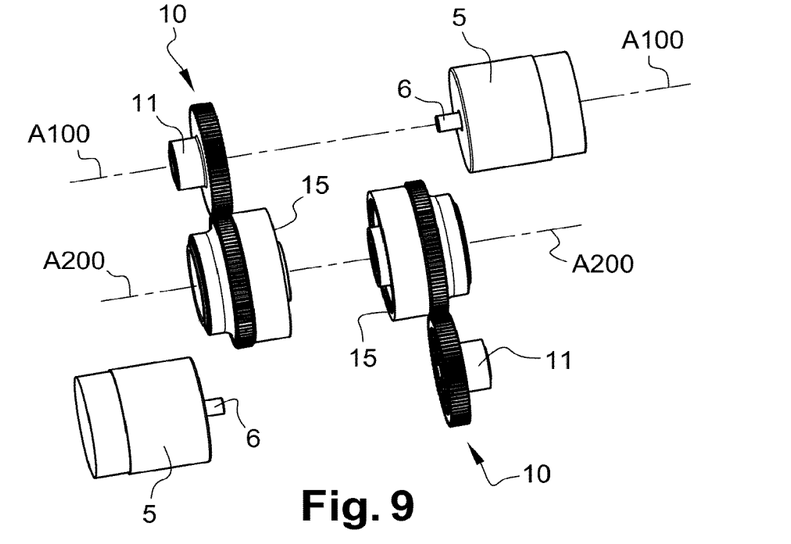
FIG. 9 is an exploded perspective view of two powertrain modules of FIG. 1 configured to be mechanically connected to one another
Figure 10:
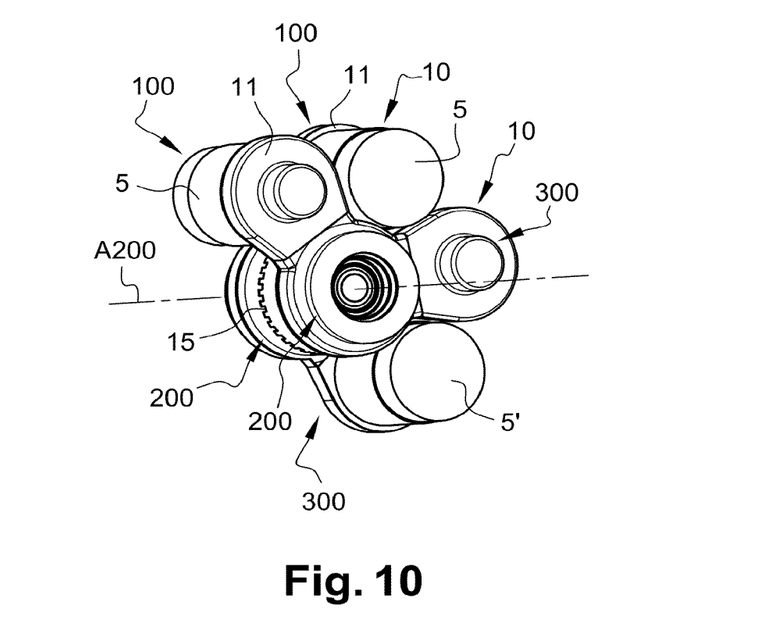
FIG. 10 shows two powertrain modules of FIG. 6 mechanically connected to one another.

To solve this, as illustrated in FIGS. 9 and 10, the powertrain modules 10 are distinct but designed and assembled in a specific way.

More precisely, the casing 11 comprises connecting means 15 for engaging the connecting means 15 of an identical powertrain module 10, for mechanically connecting the casings 11 of said two powertrain modules 10 arranged in a facing relationship. Owing to this feature, the assembly comprising the two casings 11 forms a unit which is capable of handling gear reduction forces/torques. Furthermore, this provides a fairly compact design.

The connecting means of a given powertrain module 10 are preferably configured to engage the connecting means of an identical powertrain module 10, when said powertrain modules 10 are arranged with their second axes A200 substantially coincident, the casings 11 being rotationally offset the one relative to the other relative to said second axes A200.

In the embodiment illustrated in the figures, the connecting means 15 comprise a dog clutch connection. However, other connecting means can be implemented, provided they ensure an appropriate mechanical connection, such as splines, teeth, etc.

In the embodiment illustrated in FIG. 9, each powertrain module 10 comprises a single motor 5.

However, one powertrain module 10 or both powertrain modules 10 could comprise at least one additional motor 5', or at least one receiving area 14 for such an additional motor 5'.

Then, as shown in FIGS. 6 and 10, the plane including the first axis A100 and the second axis A200 and the plane including the second axis A200 and the axis A300 of the additional epicyclic gear train 300 can form an angle α the tip of which is coincident with the second axis A200. The casing 11 can thus have the shape of a V, when seen along the transverse direction Y, i.e. the direction of the axes A100, A200. Angle α comprised between 80° and 180°, preferably between 100° and 160°. However, the value of α depends on various parameters such as the diameter of the motor(s) 5, 5', the diameter of the epicyclic gear trains 100, 200, 300. Said value is further determined taking into account the departure angle, the wheel diameter, the required ground clearance, etc.

This V-shaped configuration allows assembling two powertrain modules 10 as a particularly compact assembly. Indeed, as shown in FIG. 10, the powertrain modules 10 can be arranged in a facing relationship, with the second axes A200 substantially coincident, the casing 11 of one powertrain module 10 being rotationally offset—around axis A200—relative to the casing 11 of the other powertrain module 10. Then, one motor 5 of one powertrain module 10 is located between the two legs of the V-shaped casing 11 of the other powertrain module 10. As a result, the two powertrain modules 10 occupy a limited space which is preferably included in the cylindrical transverse space defined by the wheels 3 of the driven wheel system 2. There remains quite a lot of space available for other purposes.

Figure 12:
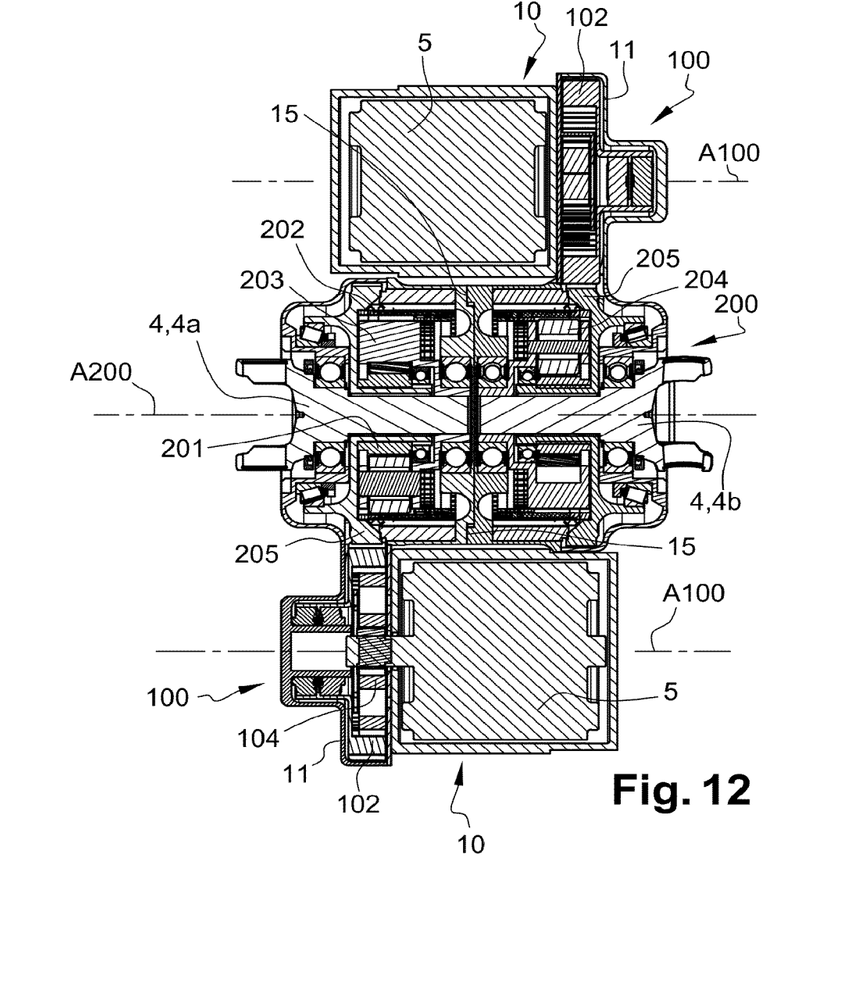
FIG. 12 is a sectional view of the powertrain modules of FIG. 11.

Moreover, because of the assembly according to a facing relationship, the motors 5, 5' of one powertrain module 10 extend from the corresponding casing 11 in one direction, and the motors 5, 5' of the other powertrain module 10 extend from the corresponding casing 11 in the opposite direction, as can be seen in FIG. 12. Consequently, the assembly comprising the two powertrain modules 10 is included, along the transverse direction Y, between the casing 11 of one powertrain module 10 and the casing 11 of the other powertrain module 10. This enhances the overall compactness in the transverse direction Y.

The powertrain module 10 of the invention can be implemented on a vehicle 1 having an independent wheel suspension configuration, as illustrated in FIGS. 11 and 12.

In an independent wheel suspension configuration, the connection between one wheel 3 and one powertrain module 10 is made by means of a connection device including a driveshaft 4, at least one joint, at least one lower arm articulated at both ends and preferably at least one upper arm articulated at both ends (not shown in the figures).

With a torque vectoring solution, as illustrated in FIGS. 11 and 12, the driven wheel system 2 comprises two powertrain modules 10, each of the left wheel(s) 3a and the right wheel(s) 3b being connected to a dedicated powertrain module 10 by means of a dedicated connection device, as described above. One drive shaft 4a, 4b is rotated by the corresponding planet carrier 203. The powertrain modules 10 are assembled as shown on FIG. 10, by means of the connecting means 15.

It has to be noted that, although the powertrain modules 10 in FIGS. 11 and 12 include two motors 5, 5', this should not be considered as limitative.

Figure 14:
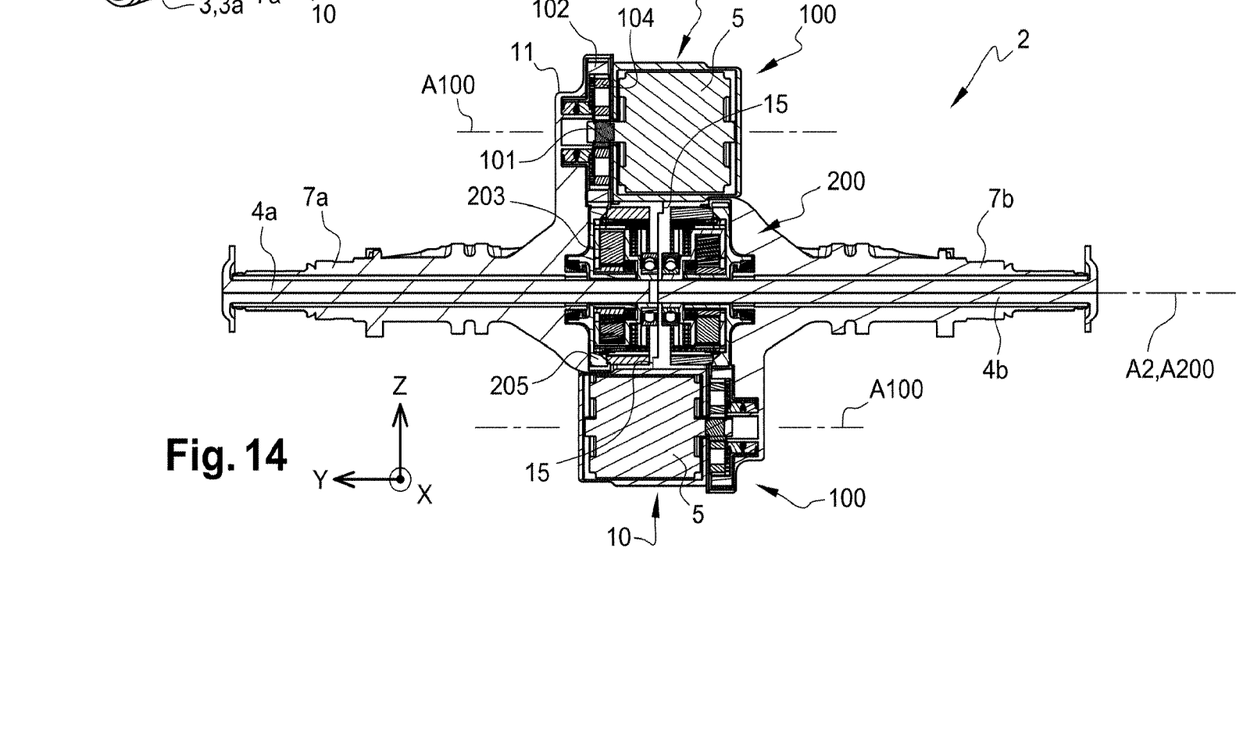
FIG. 14 is a sectional view of the powertrain modules of FIG. 13.

According to a variant, the powertrain module 10 of the invention can be implemented on a vehicle 1 having a rigid axle configuration, as illustrated in FIGS. 13 and 14. The driven wheel system 2 then forms an axle and comprises:

a first axle housing 7a secured to one side of the casing 11 of one powertrain module 10, preferably opposite the motor(s) 5, 5', and receiving a first drive shaft 4a connected to a first wheel 3a of the driven wheel system 2;

a second axle housing 7b receiving a second drive shaft 4b connected to a second wheel 3b of the driven wheel system 2, and secured to a casing 11 housing the transmission system 13 of another powertrain module 10.

The casings 11 of the two powertrain modules 10 are separate and assembled as shown on FIG. 10, by means of the connecting means 15.

It has to be noted that, although the powertrain modules 10 in FIG. 13 include two motors 5, 5', this should not be considered as limitative.

As can be seen on FIGS. 11 to 14, the powertrain modules 10 are substantially arranged in a virtual cylindrical transverse space defined by the wheels 3 of the driven wheel system 2, which makes the arrangement fairly compact.

The invention therefore provides a compact powertrain system which however is modular and/or scalable, as it is based on a "basic" powertrain module:

which can be upgraded with at least one additional motor;
   which can be assembled in different ways and/or quantities, to fit the customer needs. For example, the powertrain module can be duplicated to pass from a 4×2 to a 6×4 solution.

Having a unitary modular powertrain module which can be used on various uses/applications/ranges makes it possible:

to have a high volume and low cost parts, i.e. a cost efficient solution;
   to manufacture and assemble the module at reasonable investment level;
   to automatize the manufacturing and assembly;
   to reduce the parts to manage and maintain It is to be understood that the present invention is not limited to the embodiments described above and illustrated in the drawings; rather, the skilled person will recognize that many changes and modifications may be made within the scope of the appended claims.

In particular, although the powertrain module 10 has been described as comprising two epicyclic gear trains, any other appropriate type of transmission system, typically including gear system(s), could be envisaged. The type of transmission system is not correlated to the connecting means provided on the casing for allowing an improved assembly of two powertrain modules.

The invention claimed is:

1. A powertrain module comprising:
a powertrain system for driving at least one wheel of a vehicle, the powertrain system comprising:
a motor having an output shaft; and
a transmission system between the motor and a drive shaft connected to said wheel; and
a casing which houses the transmission system; wherein the powertrain module comprises a connector cooperating with a connector of a distinct identical powertrain module arranged in a facing relationship with said powertrain module, for mechanically connecting said two powertrain modules;
the transmission system has a first axis associated with the motor output shaft and a second axis configured to be associated to the drive shaft, the first and second axes being parallel, and in that the connector is configured to cooperate with the connector of the distinct identical powertrain module, such that said powertrain modules are arranged so that the second axes of the transmission systems of the two powertrain modules are substantially coincident, and such that the casings of the two powertrain modules are offset with respect to each other around said second axes.

2. The powertrain module according to claim 1, wherein the connecting means are provided on the casing of the powertrain module and are configured for mechanically connecting the casing of said powertrain module and the casing of an identical powertrain module arranged in a facing relationship with said powertrain module.

3. The powertrain module according to claim 1, wherein the connecting means comprise a dog clutch connection.

4. The powertrain module according to claim 1, wherein the casing comprises at least one receiving area for a gear system configured to be connected to the output shaft of an additional motor, the gear system having an axis parallel to the first and second axes and meshing with a part of the transmission system.

5. The powertrain module according to claim 4, wherein the plane including the first axis and the second axis and the plane including the second axis and the axis of the gear system form an angle comprised between 80.degree. and 180.degree.

6. The powertrain module according to claim 1 wherein it further comprises at least one additional motor and at least one gear system connected to or connectable to the additional motor, the gear system being mounted or configured to be mounted in the or one of the receiving area(s) of the casing.

7. The powertrain module according to claim 1, wherein the transmission system comprises two epicyclic gear trains each including the following components: a ring, a sun, a planet carrier and planet gears, wherein: a first of the two epicyclic gear trains has a first axis, a first input component connected to the motor output shaft, and a first output component; a second of the two epicyclic gear trains has a second axis parallel to the first axis, a second input component meshing with the first output component, and a second output component configured to be connected to the drive shaft.

8. The powertrain module according to claim 7, wherein the ring or an intermediate part slidably mounted on the outer part of the ring is movable between at least a first position, in which the motor is able to transmit torque to the drive shaft according to a first gear ratio and a second position, in which the motor is able to transmit torque to the drive shaft according to a second gear ratio.

9. The powertrain module according to claim 7, wherein the ring or an intermediate part slidably mounted on the outer part of the ring is movable between at least one position in which the motor is able to transmit torque to the drive shaft and a neutral position in which no torque can be transmitted from the motor to the drive shaft.

10. The powertrain module according to claim 7, wherein the ring of one of the epicyclic gear trains forms the first output component or respectively the second input component, and in that said ring has inner teeth for meshing with the planet gears of the same epicyclic gear train and outer teeth for meshing with the second input component or respectively the first output component.

11. The powertrain module according to claim 7, wherein the first input component is the sun and the first output component is the ring.

12. The powertrain module according to claim 7, wherein the second input component is the sun and the second output component is the planet carrier, planet gears being rotationally mounted on the planet carrier and being arranged between the sun and the ring.

13. The powertrain module according to claim 7, in wherein, in the first epicyclic gear train, the sun is configured as an inner component, the ring is configured as an outer component, with the planet gears arranged in between and rotationally mounted on the planet carrier, the planet carrier is fastened to the casing of the powertrain module, and in that said ring of the first epicyclic gear train has inner teeth for meshing with the planet gears of the first epicyclic gear train and outer teeth for meshing with the sun of the second epicyclic gear train or a hub secured to said sun, the inner teeth and outer teeth being located in one and the same plane orthogonal to the first and second axes.

14. The powertrain module according to claim 13, with a powertrain system, wherein the ring of the second epicyclic gear train is movable relative to the casing, parallel to the first and second axes, between: the first position, in which said ring is rotationally fastened to the sun of the second epicyclic gear train or to a hub secured to said sun; and the second position, in which said ring is rotationally fastened to the casing.

15. The powertrain module according to claim 13, with a powertrain system, wherein the ring of the second epicyclic gear train is movable relative to the casing, parallel to the first and second axes, between at least one of a first position, in which said ring is rotationally fastened to the sun of the second epicyclic gear train or to a hub secured to said sun; a second position, in which said ring is rotationally fastened to the casing; and a neutral position in which said ring is rotationally uncoupled from both the sun of the second epicyclic gear train and the casing.

16. A driven wheel system for a vehicle, comprising at least one left wheel and one right wheel, each wheel being connected to a drive shaft, wherein it further comprises at least one powertrain module according to claim 1.

17. The driven wheel system according to claim 16, the driven wheel system forming an axle and comprising: a first axle housing secured to one side of the casing of the at least one powertrain module and receiving the first drive shaft connected between the first wheel of the driven wheel system and the powertrain system of said at least one powertrain module; a second axle housing receiving the second drive shaft said second drive shaft being connected between the second wheel of the driven wheel system and the powertrain system of another powertrain module, the second axle housing being secured to the casing of said other powertrain module; wherein said two powertrain modules are arranged in a facing relationship and are connected via their respective connecting means.

18. The driven wheel system according to claim 16, wherein the connection between one of the at least one left wheel and one right wheel and the at least one powertrain module is made via a connection device including the driveshaft and at least one joint, wherein the at least one powertrain module comprises two powertrain modules, the first wheel being connected to a first of the two powertrain modules via the first connection device, and the second wheel being connected to a second of the two powertrain modules via the second connection device, wherein said two powertrain modules are arranged in a facing relationship and are connected via their respective connecting means.

19. A vehicle comprising at least one driven wheel system according to claim 16.

* * * * *